United States Patent
Zhu et al.

(10) Patent No.: US 10,431,246 B2
(45) Date of Patent: Oct. 1, 2019

(54) DUAL ACTUATOR STORAGE DEVICE UTILIZING MULTIPLE DISK ZONES

(71) Applicant: Seagate Technology LLC, Cupertino, CA (US)

(72) Inventors: Wenzhong Zhu, Apple Valley, MN (US); Kenneth Haapala, Plymouth, MN (US); Jon D. Trantham, Chanhassen, MN (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 15/381,016

(22) Filed: Dec. 15, 2016

(65) Prior Publication Data
US 2018/0174613 A1    Jun. 21, 2018

(51) Int. Cl.
*G11B 5/55* (2006.01)
*G11B 5/48* (2006.01)
*G11B 5/012* (2006.01)
*G11B 5/54* (2006.01)

(52) U.S. Cl.
CPC ............ *G11B 5/5578* (2013.01); *G11B 5/012* (2013.01); *G11B 5/4813* (2013.01); *G11B 5/54* (2013.01); *G11B 5/55* (2013.01); *G11B 5/5539* (2013.01)

(58) Field of Classification Search
CPC .. G11B 5/48–5/4813; G11B 5/54–5/55; G11B 5/5521–5/5539; G11B 5/5569–5/5578
USPC .................... 360/55, 69, 75–76, 78.04, 78.12
See application file for complete search history.

(56) References Cited

U.S. PATENT DOCUMENTS

| | | | | |
|---|---|---|---|---|
| 4,577,240 A | * | 3/1986 | Hedberg | G11B 5/5578 360/78.12 |
| 4,751,596 A | * | 6/1988 | Rohart | G11B 5/5578 360/256.3 |
| 4,823,196 A | * | 4/1989 | Goddard | G11B 19/28 386/203 |
| 4,972,396 A | * | 11/1990 | Rafner | G11B 5/4886 360/18 |
| 5,081,552 A | | 1/1992 | Glaser et al. | |
| 5,202,799 A | | 4/1993 | Hetzler et al. | |
| 5,223,993 A | | 6/1993 | Squires et al. | |
| 5,293,282 A | | 3/1994 | Squires et al. | |
| 5,343,347 A | | 8/1994 | Gilovich | |
| 5,355,486 A | | 10/1994 | Cornaby | |

(Continued)

FOREIGN PATENT DOCUMENTS

JP            10208411 A  *  8/1998

OTHER PUBLICATIONS

Computer translation of JP 10-208411 A, Okada Shunji, Aug., 7th, 1998. (Year: 1998).*

(Continued)

*Primary Examiner* — Tan X Dinh
(74) *Attorney, Agent, or Firm* — Mueting, Raasch & Gebhardt

(57) ABSTRACT

A recording surface of a magnetic disk is divided into first and second zones. A first head of a first actuator arm assembly reads from and/or writes to the first zone exclusively. A second head of a second actuator arm assembly reads from and/or writes to the second zone exclusively. The first and second head are capable of simultaneously reading from and writing to the recording surface.

17 Claims, 4 Drawing Sheets

(56) References Cited

U.S. PATENT DOCUMENTS

| | | | |
|---|---|---|---|
| 5,523,901 A * | 6/1996 | Anderson | G11B 5/59616 360/51 |
| 6,021,024 A * | 2/2000 | Akiyama | G11B 5/012 360/234.6 |
| 6,057,990 A * | 5/2000 | Gilovich | G11B 5/4893 360/246.7 |
| 6,081,399 A * | 6/2000 | Lee | G11B 5/4886 360/61 |
| 6,185,063 B1 | 2/2001 | Cameron | |
| 6,317,282 B1 * | 11/2001 | Nam | G11B 5/488 360/75 |
| 6,483,654 B2 * | 11/2002 | Nam | G11B 5/488 360/75 |
| 6,502,178 B1 | 12/2002 | Olbrich | |
| 6,658,201 B1 * | 12/2003 | Rebalski | G11B 5/012 369/124.09 |
| 6,690,549 B1 * | 2/2004 | Aikawa | G11B 5/4813 360/264.4 |
| 6,735,032 B2 * | 5/2004 | Dunn | G11B 5/59633 360/78.12 |
| 6,883,062 B2 * | 4/2005 | Susnjar | G11B 5/5578 360/246.6 |
| 7,102,842 B1 * | 9/2006 | Howard | G11B 5/5521 360/61 |
| 7,123,435 B1 | 10/2006 | Schreck | |
| 7,146,623 B2 * | 12/2006 | Kuwajima | G11B 5/5578 720/662 |
| 7,193,807 B1 * | 3/2007 | Liikanen | G11B 5/4826 360/76 |
| 7,199,981 B2 | 4/2007 | Zabtcioglu | |
| 7,315,429 B2 * | 1/2008 | van Zyl | G11B 5/4806 360/61 |
| 7,379,257 B2 * | 5/2008 | Yamagishi | G11B 5/29 360/78.12 |
| 7,385,781 B1 * | 6/2008 | Craig | G11B 5/5578 360/78.12 |
| 7,430,091 B2 * | 9/2008 | Manasse | G11B 5/5578 360/78.12 |
| 7,679,851 B1 * | 3/2010 | Sun | G11B 5/012 360/48 |
| 7,710,683 B2 * | 5/2010 | Craig | G11B 5/5578 360/78.04 |
| 8,223,451 B2 * | 7/2012 | Breslau | G11B 5/5521 360/75 |
| 8,351,147 B2 * | 1/2013 | Breslau | G11B 5/5521 360/75 |
| 8,699,175 B1 | 4/2014 | Olds et al. | |
| 8,953,276 B1 | 2/2015 | Pokharel et al. | |
| 9,099,103 B1 | 8/2015 | Krichevsky | |
| 9,418,688 B1 | 8/2016 | Rausch et al. | |
| 9,472,223 B1 | 10/2016 | Mendonsa et al. | |
| 9,508,362 B2 | 11/2016 | Gao et al. | |
| 9,508,370 B1 | 11/2016 | Zhu et al. | |
| 9,570,104 B1 | 2/2017 | Erden et al. | |
| 9,633,675 B2 | 4/2017 | Zhu et al. | |
| 9,666,213 B1 | 5/2017 | Erden et al. | |
| 9,830,938 B1 | 11/2017 | Aoki et al. | |
| 9,830,939 B1 * | 11/2017 | Hamilton | G11B 5/5578 |
| 9,830,944 B1 | 11/2017 | Mendonsa et al. | |
| 9,911,442 B1 | 3/2018 | Kharisov et al. | |
| 10,002,625 B1 * | 6/2018 | Erden | G11B 5/4886 |
| 10,037,779 B1 * | 7/2018 | Mendonsa | G11B 21/08 |
| 10,043,543 B1 | 8/2018 | Buch et al. | |
| 10,068,597 B1 | 9/2018 | Jury et al. | |
| 2004/0179465 A1 | 9/2004 | Kuwajima | G11B 5/5521 369/300 |
| 2007/0297083 A1 | 12/2007 | Van Zyl | |
| 2008/0123213 A1 * | 5/2008 | Craig | G06F 3/0676 360/75 |
| 2008/0239554 A1 * | 10/2008 | Takeda | G11B 5/59633 360/77.02 |
| 2012/0250177 A1 | 10/2012 | Somanche et al. | |
| 2016/0147650 A1 | 5/2016 | Gao et al. | |
| 2016/0148630 A1 | 5/2016 | Rausch | |
| 2016/0148636 A1 | 5/2016 | Ma et al. | |
| 2016/0148637 A1 | 5/2016 | Rausch et al. | |
| 2016/0148641 A1 | 5/2016 | Gao et al. | |
| 2017/0168908 A1 * | 6/2017 | Abali | G06F 11/2069 |
| 2017/0309304 A1 | 10/2017 | Tan et al. | |
| 2017/0330587 A1 | 11/2017 | Gao et al. | |
| 2018/0174613 A1 | 6/2018 | Zhu et al. | |

OTHER PUBLICATIONS

U.S. Appl. No. 15/939,493, filed Mar. 29, 2018, Granz et al.

U.S. Appl. No. 15/939,502, filed Mar. 29, 2018, Granz et al.

File History for U.S. Appl. No. 15/939,493 as retrieved from the U.S. Patent and Trademark Office PAIR System on Oct. 25, 2018, 96 pages.

File History for U.S. Appl. No. 15/939,502 as retrieved from the U.S. Patent and Trademark Office PAIR System on Jan. 24, 2019.

File History for U.S. Appl. No. 15/939,493 as retrieved from the U.S. Patent and Trademark Office PAIR System on May 14, 2019, 127 pages.

File History for U.S. Appl. No. 15/939,502 as retrieved from the U.S. Patent and Trademark Office PAIR System on May 14, 2019, 162 pages.

\* cited by examiner

DUAL ACTUATOR STORAGE DEVICE UTILIZING MULTIPLE DISK ZONES

SUMMARY

The present disclosure is directed to a dual actuator storage device utilizing multiple disk zones. In one embodiment, a recording surface of a magnetic disk is divided into first and second zones. A first head of a first actuator arm assembly reads from and/or writes to the first zone exclusively. A second head of a second actuator arm assembly reads from and/or writes to the second zone exclusively. The first and second head are capable of simultaneously reading from and writing to the recording surface.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to disk drive storage. While newer technologies such as solid-state drives (SSD) are gaining popularity due, e.g., to high speed and mechanical ruggedness, there are still a number of applications where traditional magnetic disk storage, or hard disk drive (HDD), is preferable. The cost per unit of data stored for disk storage is much lower than in newer technologies such as SSD. For some applications, such as recording video, the combination of low cost and good sequential read/write performance makes the HDD the best option. Even in systems where an SSD is used, e.g., for the operating system, an HDD is often added for user data storage. Accordingly, manufacturers still seek to improve HDD performance while still retaining cost advantages over other types of drives.

In order to improve sequential write performance of an HDD, a number of schemes have been developed that allow two or more read/write heads to access the recording media in parallel. Parallelism allows for as much as doubling sequential data rates, increases large block random input-output-per-second (IOPS) by 20-50% over a single-stream drive, and reduces manufacturing test time. One way to achieve parallelism is to use two independent actuators that both actuators cover the same recording area on a common spindle motor and disk pack.

Figure 1:
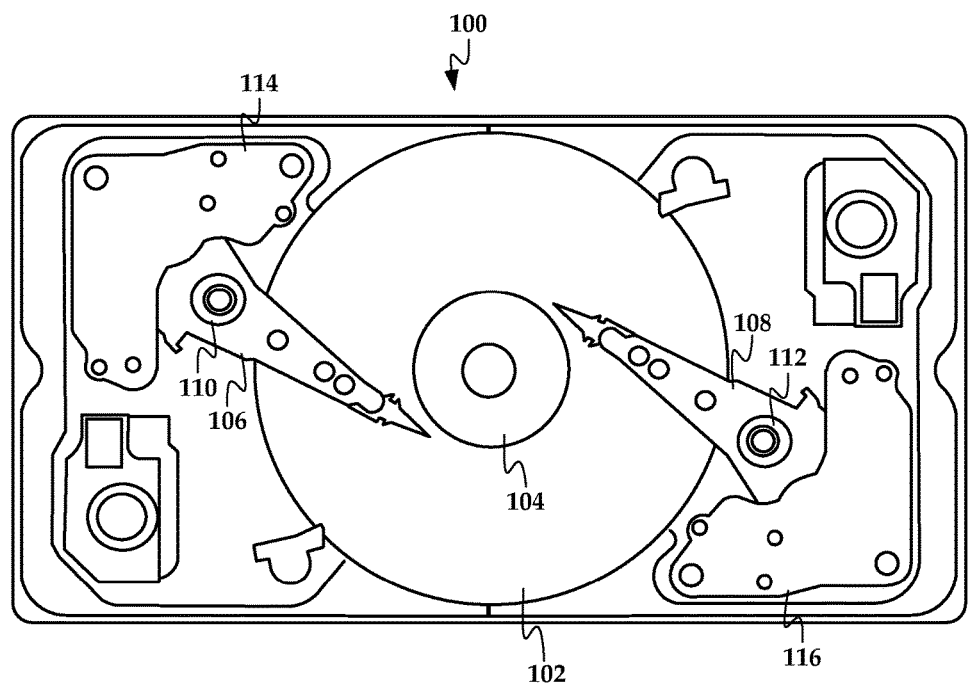
FIG. 1 is a top view of a data storage device according to an example embodiment.

In FIG. 1, a block diagram shows a data storage device 100 according to an example embodiment. The device 100 includes one or more magnetic disks 102 driven by a common spindle motor 104. Two arms 106, 108 that rotate about separate pivots 110, 112 are driven by respective actuator motors 114, 116. The actuator motors 114, 116 are also often referred to as voice coil motors (VCMs). The actuator motors 114, 116 cause the arms 106, 108 to change radial locations (tracks) in response to inputs from a servo controller. The pivots 110, 112 are located on opposite sides of the disk 102 in this example. In the following disclosure, the arms 106, 108 and actuator motors 114, 116 are collectively referred to as actuator assemblies. More than two actuator assemblies can be used, albeit with a corresponding increase in size and weight of the device.

The arms 106, 108 each have a read/write head (also referred to as a slider, reader, writer, etc.) at the distal end. Because both surfaces of the disk(s) 102 may be used for data storage, there may be arms over both surfaces of the disk 102 each with one read/write head for each disk surface. Because the illustrated device 100 has two independent arms 106, 108, each read/write head can simultaneously read from or write to different parts of the same disk surface, or different surfaces of the same or different disks. The reading/writing can be coordinated, e.g., each read/write head handling part of the same data stream. The reading/writing can also be independent, e.g., each read/write head handling different data streams, e.g., each associated with different host requests.

An independent actuator system as shown in FIG. 1 is less complex than to other proposed parallelism designs, such as one using a single VCM with micro-actuators to control heads and simultaneously transfer data on the opposite sides of a disk. The system shown in FIG. 1 can utilize existing servo control systems to control the separate arms 106, 108. The system can utilize conventional (e.g., perpendicular) read/write heads, and can also be adapted to newer technologies, such as heat-assisted magnetic recording (HAMR).

If the read/write heads in a configuration as shown in FIG. 1 are configured to read and write the same tracks on the same surface, the system will have to account for matching the read/write heads to the tracks. Due to manufacturing tolerances, each read/write head will have slightly different characteristics, such as write width, magnetic field strength, reader resolution, reader width, reader-to-writer offset, etc. In a conventional drive where only one head writes to a surface, track geometry can be customized to account for the characteristics of the head writing to each surface. When using two heads on the same surface, the selected track geometry needs to take into account differences between the heads.

Figure 2:
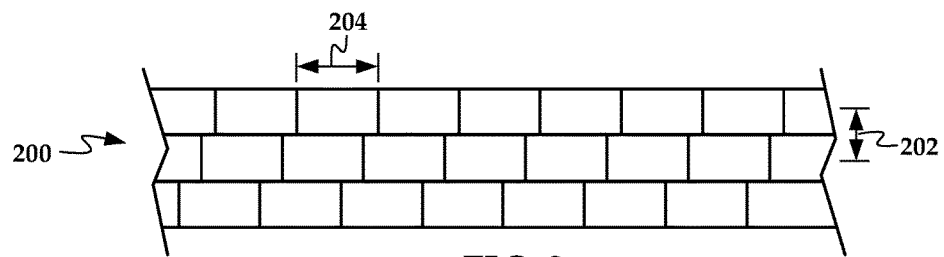
FIGS. 2 and 3 are block diagram showing tracks having different geometry that may be used on the same recording medium according to an example embodiment.
Figure 3:
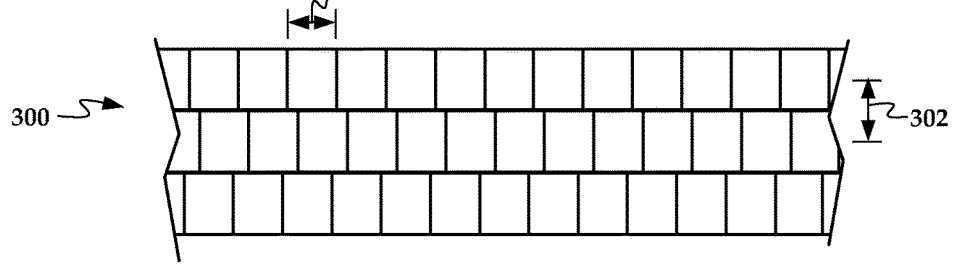

In FIGS. 2 and 3, block diagram shows tracks 200, 300 having different geometry that may be used on the same data storage device. The track center-to-center distance 202, or track pitch, in FIG. 2 is smaller than the corresponding distance 302 in FIG. 3. This means that the configuration shown in FIG. 2 has higher track density, often expressed in tracks per inch (TPI). The distance 204 between bit transitions in FIG. 2 is larger than corresponding distance 304 in FIG. 3. This means that the configuration in FIG. 3 has higher linear bit density, often expressed in bits per inch (BPI). Note that for actual data there may not be a magnetic transition for every vertical line shown in FIGS. 2 and 3.

Generally, the lines indicate a minimum distance between transitions, and in cases where adjacent bits are the same, a bit boundary may be inferred, e.g., by a clock in the read or write channel.

Generally, the TPI and BPI and suitable for particular heads may be determined in the factory after manufacture and testing of the head. For example, the heads can be tested and sorted based on various criteria that determine a maximum TPI and BPI for each head. When used in a configuration where different read/write heads read/write the same tracks on the same surface, the heads will need to read and write at the same TPI and BPI. In order to do this, the lowest TPI and BPI of both heads will need to be selected. However, this provides the minimal amount of areal density (ADC), because the ADC is generally a function of the TPI times the BPI.

The dual actuator configuration with both heads reading the same tracks can increase the factory test time due to the need to have the heads on the same surface be able to reliably read the same tracks. For example, this may involve testing the combination of writer and reader of both heads on each radial zone of the disk for channel optimization, determining bit-aspect ratio (e.g., TPI and BPI as shown in FIGS. 2 and 3), determining/minimizing adjacent track interference (ATI), etc. In addition, the servo control system will store data tables for correction of repeatable runout (RRO) and skew, and these tables will be duplicated for both heads. There may also be an ADC penalty due to head alignment. For example, there will be an angle between the track written by one head's writer and read by the other head's reader. Track characteristics such as TPI may need to be increased to account for the these angles.

In embodiments discussed below, a data storage device 100 as shown in FIG. 1 divides the disk surface into zones, each zone dedicated to one read/write head. The zones may be contiguous regions, or include groups of tracks interleaved with each other, each group belonging to a different zone. Each read/write head reads/writes exclusively to its target zone, thereby allowing the track geometry in the zones to be tailored to the characteristics of the head.

Figure 4:
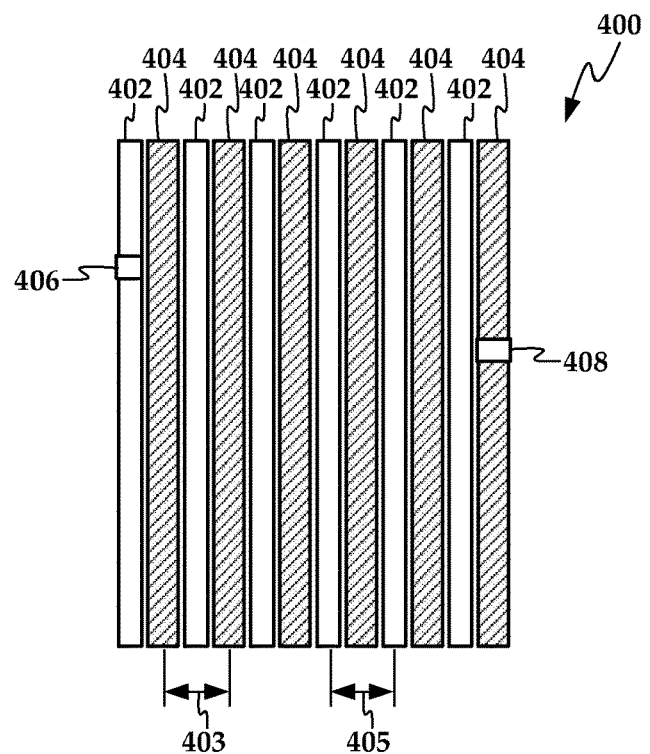
FIG. 4 is a block diagram of a format for a recording medium according to an example embodiment.

In FIG. 4, a diagram shows a format for a recording medium 400 according to an example embodiment. In this example, odd tracks 402 are written at a first track pitch 403 and even tracks 404 are written at a second track pitch 405. The even and odd tracks 402, 404 have correspondingly different track widths, e.g., the even tracks 404 being wider in this example. A first head 406 on one actuator assembly writes and reads all odd tracks 402 and a second head 408 on another actuator assembly writes and reads all even tracks 404. The BPI and TPI between odd and even tracks are totally separated. The odd track BPI and TPI are picked based on the head 406 on one actuator assembly. The even track BPI and TPI are picked based on the corresponding head 408 on the other actuator assembly. The effective BPI and TPI are the average value of two heads, which maximizes ADC given the different capabilities of the heads 406, 408.

Figure 5:
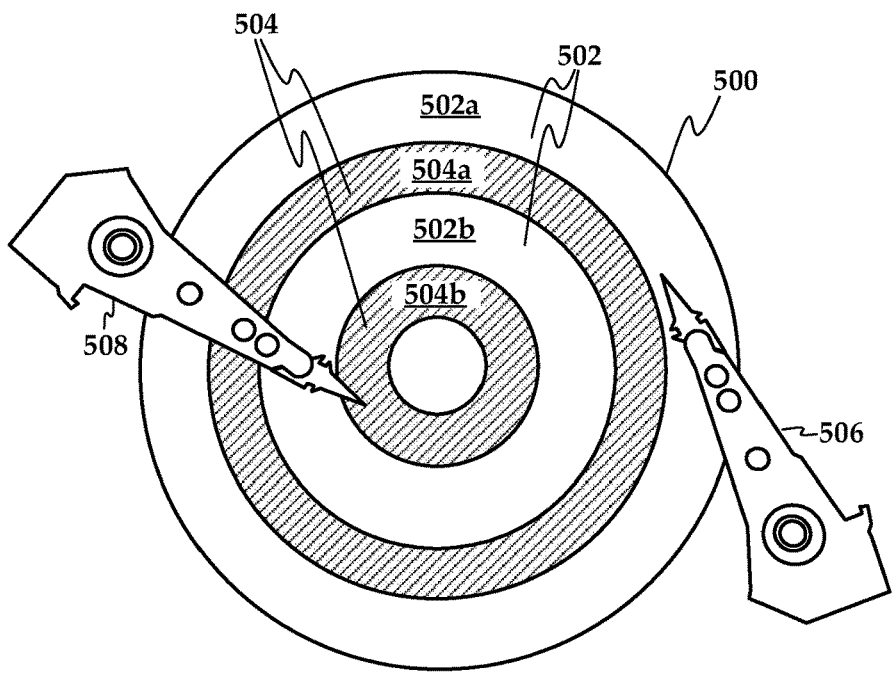
FIG. 5 is a block diagram of a format for a recording medium according to another example embodiment.

In FIG. 5, a diagram shows a format for a recording medium 500 according to another example embodiment. In this arrangement, the recording medium is divided into a first zone 502 and a second zone 504. Zone 502 has two groups 502a-b of multiple tracks, and zone 504 has two groups 504-ab of multiple tracks. These groups 502a-b, 504a-b may correspond to servo zones that utilize different numbers of sectors per track to maintain approximately equal sector size between inner and outer diameter of the disk 500. For purposes of simplicity, a total of two groups of tracks for each zone is shown in FIG. 5, however the recording medium 500 may be divided, evenly or unevenly, into any number of groups, and those groups be assigned in any order to the two zones (or more zones if more heads are used).

The head on first actuator assembly 506 exclusively writes and reads all tracks in the first zone 502 and head on another actuator assembly 508 exclusively writes and reads all tracks in the second zone 504. The first and second zones 502, 504 have BPI and TPI optimized for their respective read/write heads. The system of alternating group design may be more simple to implement compared to that of alternating tracks since each group within zones 502, 504 may only have one BPI and one TPI. This may also reduce the factory test time and firmware complexity.

Generally, the embodiments in FIGS. 4 and 5 are both examples first and second groups of tracks arranged such that the first groups of tracks are interleaved between the second groups of tracks. A subset of the groups is assigned to one zone and the remaining groups are assigned to the other zone. The case in FIG. 4 represents a configuration where each group is a single track. The case in FIG. 5 represents a configuration where each group is greater than one track. In the latter case, the groups can be equal or different sizes. For example, in FIG. 5 the individual groups 502a-b that make up zone 502 may have the same amount of storage space but different numbers of tracks, or vice versa. The groups 504a-b that make up zone 504 may have the same or different arrangement.

Figure 6:
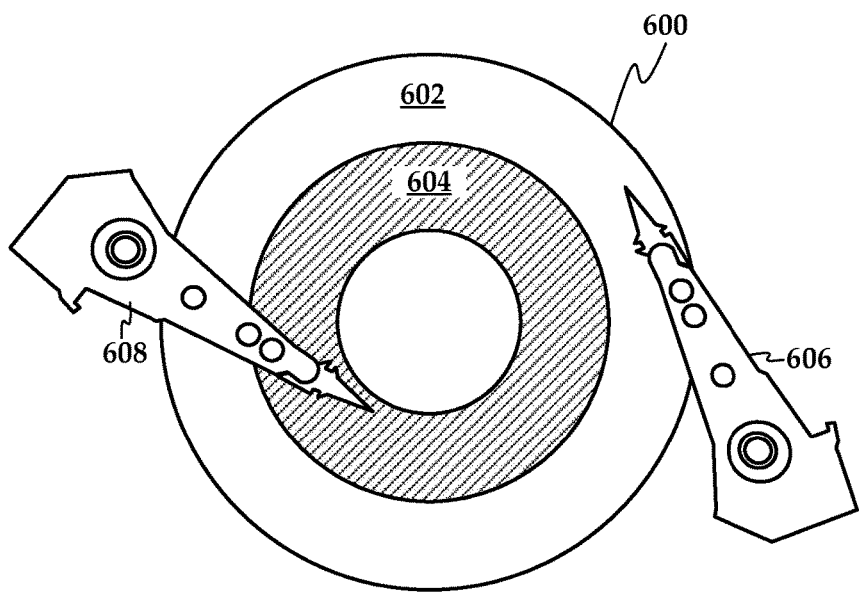
FIG. 6 is a block diagram of a format for a recording medium according to another example embodiment.

In FIG. 6, a diagram shows a format for a recording medium 600 according to another example embodiment. The recording medium surface is separated into two regions 602, 604, which are inner and outer annuli of the disk 600. Region 602 is an outer radius area for the head on a first actuator assembly 606. Region 606 is an inner radius area for the head on the other actuator assembly 608. The first and second regions 602, 604 have BPI and TPI optimized for their respective read/write heads. This arrangement may improve random IOPS and ADC.

In alternate embodiments the allocation of zones to heads may be different when reading versus writing. For example, in FIGS. 4 and 5, the head on one actuator may be used for writing a recording zone, while the head from the other actuator may be used for reading that zone. In another embodiment, certain zones may only be written by the recording head on one actuator, but may be readable by the recording heads on both of the actuators. The opposite is also possible, e.g., certain zones may be written by recording heads from both actuators, but may be read by the recording head from only one of the actuators.

Figure 7:
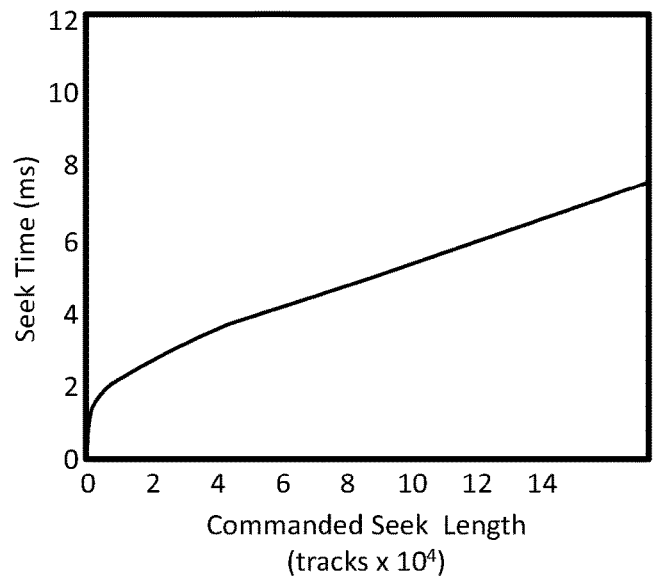
FIG. 7 is a graph showing seek length vs. seek time for a hard drive according to an example embodiment.

In FIG. 7, a graph shows the seek length vs. seek time for an example hard drive. The seek time increases monotonically with seek length. It takes about 7.2 ms when seeks from the minimum track to maximum track or vise verse. In the arrangement of FIG. 6, the seek between innermost and outermost portions of regions 602 and 604 is half of what it would be if the dedicated regions were spread across the disk. By shortening the seek length to half, the average seek time is reduced and random IOPS is improved.

The outer/inner design configuration shown in FIG. 6 could also improve ADC by reducing skew angle and data rate effect. Note that each actuator assembly 606, 608 has to track only half the angle than if the arms traversed the entire surface of the medium 600. As such the heads can be designed for a reduced skew angle at the maximum skew locations, which are typically at the inner and outer edges of the annuli 602, 604. The format and reduction in skew angle by half would reduce track pitch and improve adjacent track interface performance. It may also benefit the head-to-disk interface, such as ABS design optimization for skew angle. Furthermore, since the data rate at the inner radius area 604 is lower than that of the outer radius area 602, each head can be optimized separately. For example, a high data rate/low ADC head can be used for the outer radius area 602, and low data rate/high ADC head can be used for the inner radius area 604. In such a case one high-data rate head and one low-data rate head can be used, which can achieve higher ADC than two high-data rate heads.

It should be noted that the latency in the random write/read may be longer in these configurations than in the configurations where both read/write heads can access all the tracks on the surface. In the design shown in FIGS. 4-6, the average latency is half of the revolution, same as in conventional magnetic recording. In a configuration where both read/write heads can access all the tracks on the surface, the average latency is only ¼ of the revolution. For a 5400 RPM drive, a ½ track latency is about 6 ms, compared to 3 ms for a ¼ track latency. However, this increase in latency can be offset, at least in the configuration shown in FIG. 6, by halving the seek length, as illustrated in FIG. 7.

Figure 8:
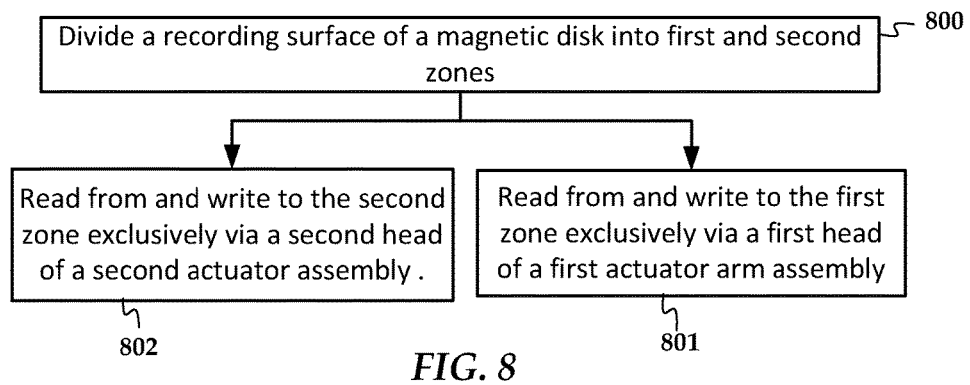
FIG. 8 is a flowchart of a method according to an example embodiment.

In FIG. 8, a flowchart shows a method according to an example embodiment. The method involves dividing 800 a recording surface of a magnetic disk into first and second zones. The first zone is read from and written to 801 exclusively via a first head of a first actuator arm assembly. The second zone is read from and written to 802 exclusively via a second head of a second actuator arm assembly. As indicated by the parallel orientation of the blocks 801, 802, the first and second head are capable of simultaneously reading from or writing to the magnetic disk. This could involve reading/writing a common data stream together that is interleaved between zones. In other embodiments, the first and second heads could be servicing different host requests at the same time, the requests affecting independent data stored in different zones.

Figure 9:
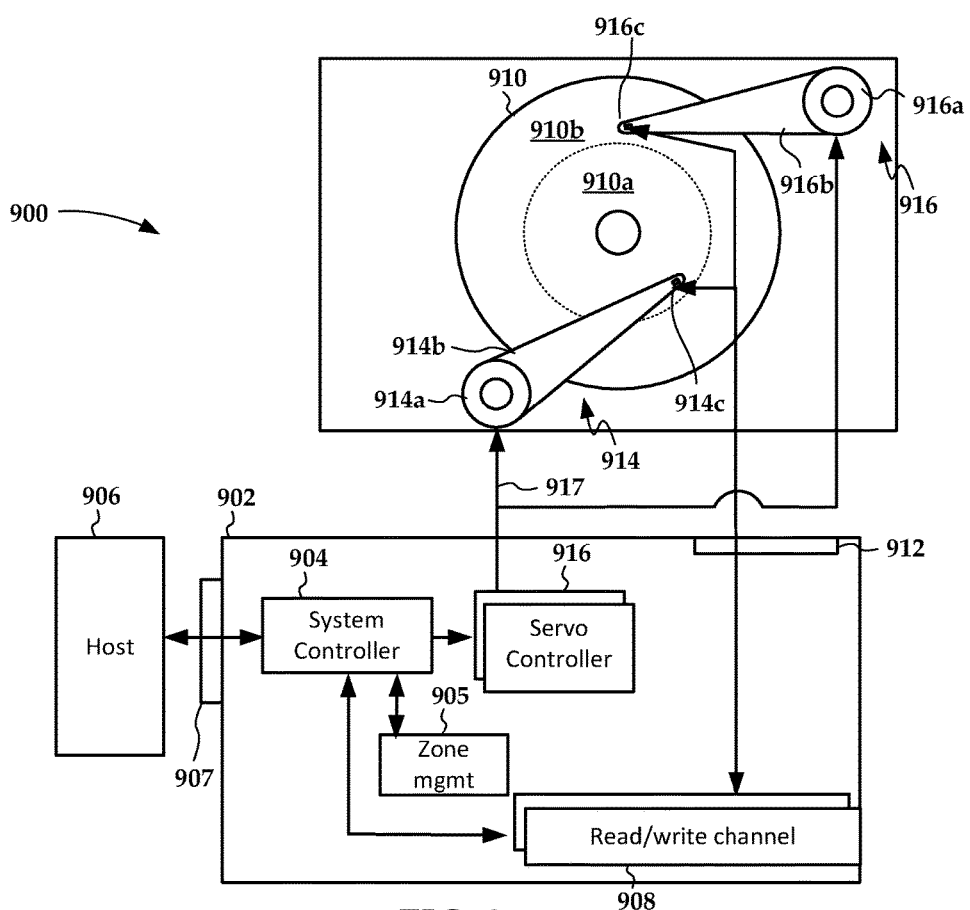
FIG. 9 is a block diagram of an apparatus according to an example embodiment.

In FIG. 9, a block diagram illustrates an apparatus 900 according to an example embodiment. The apparatus 900 includes circuitry 902 that facilitates writing data to and reading data from a magnetic disk 910. The circuitry 902 includes a system controller 904 that oversees operations of the apparatus 900. The system controller 904 may include a generally purpose central processing unit, application specific integrated circuit, multi-function chipset, etc. Generally, the system controller 904 receives commands from a host 906 via a host interface 907. The host commands may include requests to load, store, and verify data that is targeted for the disk 910.

The apparatus includes first and second actuator assemblies 914, 916 that each include respective VCMs 914a, 916a, arms 914b, 916b, and read/write heads 914c, 916c. The first and second read/write head 914c, 916c exclusively write to and read from the first and second zones 910a-b at a common surface of the disk 910. The zones 910a-b may be configured with different track pitches and/or different linear bit densities, e.g., that are optimized for the respective heads 914c, 916c.

The system controller 904 utilizes instructions that define the zones for all surfaces of all of the disks 910, and cause the heads 914c, 916c to write exclusively to the respective zones 910a-b. This is represented by zone management component 905. Servo controllers 916 cause independent movement of the first and second actuator assemblies 914, 916, e.g., for seeking to and tracking on different tracks within the respective zones. One or more read write channels 908 allow simultaneous reading and writing from the different read/write heads 914c, 916c. The read/write channel 908 may be coupled to the read write heads 914c, 916c via interface circuitry 912 such as preamplifiers, digital-to-analog converters, analog-to-digital converters, filters, etc.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus, comprising:
   a first actuator assembly comprising a first head configured to write to a recording surface of a magnetic disk;
   a second actuator assembly comprising a second head configured to write to the recording surface simultaneously with the first head; and
   a controller coupled to the first and second actuator assemblies, the controller configured to:
   divide the recording surface into first and second zones; and
   cause the first and second heads to write exclusively to the first and second zones respectively, wherein the first and second zones comprise respective two or more first groups of track and two or more second groups of tracks, the first group of tracks interleaved between the second group of tracks.

2. The apparatus of claim 1, wherein the groups each comprise a single track.

3. The apparatus of claim 1, wherein the groups each correspond to a different servo zone of the magnetic disk.

4. An apparatus, comprising:
   a first actuator assembly comprising a first head configured to write to a recording surface of a magnetic disk;
   a second actuator assembly comprising a second head configured to write to the recording surface simultaneously with the first head; and
   a controller coupled to the first and second actuator assemblies, the controller configured to:
   divide the recording surface into first and second zones; and
   cause the first and second heads to write exclusively to the first and second zones respectively, wherein the first and second zones utilize at least one of different track pitches and different linear bit densities, the first and second heads being optimized for the respective different track pitches and different linear bit densities.

5. The apparatus of claim 4, wherein the controller further causes the first and second heads to read exclusively from the first and second zones respectively.

6. A method, comprising:
dividing a recording surface of a magnetic disk into first and second zones;
reading from and writing to the first zone exclusively via a first head of a first actuator arm assembly;
reading from and writing to the second zone exclusively via a second head of a second actuator arm assembly, the first and second head capable of simultaneously reading from and writing to the recording surface; and
setting different track pitches and different linear bit densities for the first and second zones, the different track pitches and the different linear bit densities selected based on capabilities of the respective first and second heads.

7. The method of claim 6, wherein the first and second zones comprise respective two or more first groups of track and two or more second groups of tracks, the first group of tracks interleaved between the second group of tracks.

8. The method of claim 6, wherein the first and second zones comprise respective inner and outer annuli of the recording surface.

9. The method of claim 8, further comprising optimizing the first head and the second head for reduced skew angles in the inner and outer annuli.

10. The method of claim 8, further comprising configuring the outer annuli for high data rate/low areal density and configuring the inner annuli for low data rate/ high areal density.

11. An apparatus comprising:
a magnetic disk comprising a recording surface divided into first and second zones;
a first actuator arm assembly comprising a first head configured to exclusively read from the first zone; and
a second actuator assembly comprising a second head configured to exclusively read from the second zone, the first and second heads capable of simultaneously reading from the recording surface, wherein the first and second zones comprise respective two or more first groups of track and two or more second groups of tracks, the first groups of tracks interleaved between the second groups of tracks.

12. The apparatus of claim 11 wherein the first and second heads are further configured to exclusively write to the respective first and second zones.

13. The apparatus of claim 11, wherein the first head is configured to read from the first zone at a first track pitch and first linear bit density and the second head is configured to read from the second zone at a second track pitch and second linear bit density.

14. The apparatus of claim 4, wherein the first and second zones comprise respective two or more first groups of track and two or more second groups of tracks, the first group of tracks interleaved between the second group of tracks.

15. The apparatus of claim 4, wherein the first and second zones comprise respective inner and outer annuli of the recording surface.

16. The apparatus of claim 15, wherein the first head and the second head are optimized for reduced skew angles in the inner and outer annuli.

17. The apparatus of claim 15, wherein the outer annuli is configured for high data rate/low areal density and the inner annuli is configured for low data rate/ high areal density.

* * * * *